US007249379B2

(12) United States Patent
Larsen

(10) Patent No.: US 7,249,379 B2
(45) Date of Patent: Jul. 24, 2007

(54) METHOD AND APPARATUS FOR IMPLEMENTING PROCESS-BASED SECURITY IN A COMPUTER SYSTEM

(75) Inventor: Vincent Alan Larsen, Plano, TX (US)

(73) Assignee: Systems Advisory Group Enterprises, Inc., Amarillo, TX (US)

( * ) Notice: Subject to any disclaimer, the term of this patent is extended or adjusted under 35 U.S.C. 154(b) by 771 days.

(21) Appl. No.: 10/061,701

(22) Filed: Feb. 1, 2002

(65) Prior Publication Data

US 2003/0154397 A1 Aug. 14, 2003

(51) Int. Cl.
G06F 11/00 (2006.01)
G06F 12/14 (2006.01)
G06F 12/16 (2006.01)
G06F 15/18 (2006.01)
G08B 23/00 (2006.01)
H04L 9/00 (2006.01)
H04L 1/00 (2006.01)
G06F 11/30 (2006.01)
G06F 15/173 (2006.01)
G06F 15/16 (2006.01)

(52) U.S. Cl. ............... 726/22; 726/27; 726/16; 726/17; 726/18; 713/193; 713/164; 713/165; 713/166; 713/167; 709/229; 709/223

(58) Field of Classification Search ............... 713/193, 713/202, 164–167; 709/229, 223; 726/16–20, 726/27, 22
See application file for complete search history.

(56) References Cited

U.S. PATENT DOCUMENTS 4,104,718 A 8/1978 Poublan et al.

(Continued)

FOREIGN PATENT DOCUMENTS

EP 0924630 A1 6/1999

OTHER PUBLICATIONS

W. Wulf, R. Levin, C. Pierson, "Overview of the Hydra Operating System Development", Proceedings of the Fifth Symposium on Operating Systems Principles, Nov. 1975, pp. i-ii, 122-131, Association for Computing Machinery, Inc., New York.

(Continued)

*Primary Examiner*—Ayaz Sheikh
*Assistant Examiner*—Shin-Hon Chen
(74) *Attorney, Agent, or Firm*—Fenwick & West LLP

(57) ABSTRACT

A method is disclosed for providing process-based security in a special purpose computer system, comprising the steps of: configuring the special purpose computer with an operating system and at least one application for operation as a computer appliance; associating a resource access table with the at least one application, addressable by the at least one application, containing statements corresponding to predetermined requests for access to at least a one specified resource during running of the at least one application wherein the resource access table statements include information defining an execution path for the at least one application; interpreting the resource access table statements upon a request for the specified resource by the at least one application, wherein at least one of the statements in the resource access table provides for performing a security check prior to granting access to the specified resource; and causing the execution of the at least one application, upon granting access to the requested resource, including the use of the requested resource according to the execution path statements in the resource access table.

25 Claims, 7 Drawing Sheets

U.S. PATENT DOCUMENTS

| | | | |
|---|---|---|---|
| 4,901,231 | A | 2/1990 | Bishop et al. |
| 4,984,272 | A | 1/1991 | McIlroy et al. |
| 5,032,979 | A | 7/1991 | Hecht et al. |
| 5,109,515 | A | 4/1992 | Laggis et al. |
| 5,113,442 | A | 5/1992 | Moir |
| 5,200,998 | A | 4/1993 | Bakaher et al. |
| 5,301,337 | A | 4/1994 | Wells et al. |
| 5,327,531 | A | 7/1994 | Bealkowski et al. |
| 5,469,556 | A | 11/1995 | Clifton |
| 5,483,596 | A | 1/1996 | Rosenow et al. |
| 5,504,814 | A | 4/1996 | Miyahara |
| 5,572,694 | A * | 11/1996 | Uchino .......................... 718/1 |
| 5,666,415 | A | 9/1997 | Kaufman |
| 5,684,951 | A | 11/1997 | Goldman et al. |
| 5,793,943 | A | 8/1998 | Noll |
| 5,805,882 | A | 9/1998 | Cooper et al. |
| 5,826,242 | A | 10/1998 | Montulli |
| 5,925,126 | A * | 7/1999 | Hsieh .......................... 726/19 |
| 6,038,562 | A | 3/2000 | Anjur et al. |
| 6,061,790 | A | 5/2000 | Bodnar |
| 6,064,736 | A | 5/2000 | Davis et al. |
| 6,088,451 | A | 7/2000 | He et al. |
| 6,178,508 | B1 | 1/2001 | Kaufman |
| 6,185,696 | B1 | 2/2001 | Noll |
| 6,249,867 | B1 | 6/2001 | Patel |
| 6,282,618 | B1 | 8/2001 | Flenley |
| 6,381,694 | B1 | 4/2002 | Yen |
| 6,606,695 | B2 | 8/2003 | Kamano et al. |
| 6,745,332 | B1 * | 6/2004 | Wong et al. ................. 713/201 |
| 6,779,117 | B1 * | 8/2004 | Wells .......................... 713/200 |
| 6,847,991 | B1 | 1/2005 | Kurapati |
| 6,857,067 | B2 | 2/2005 | Edelman |
| 6,915,433 | B1 | 7/2005 | Barber |
| 7,007,164 | B1 | 2/2006 | Euchner |
| 7,017,162 | B2 | 3/2006 | Smith et al. |
| 7,114,078 | B2 | 9/2006 | Carman |
| 7,134,137 | B2 | 11/2006 | Joshi et al. |
| 2001/0047463 | A1 * | 11/2001 | Kamano et al. ............. 711/163 |
| 2001/0056494 | A1 * | 12/2001 | Trabelsi ...................... 709/229 |
| 2002/0026592 | A1 * | 2/2002 | Gavrila et al. ............. 713/201 |
| 2002/0073072 | A1 * | 6/2002 | Fukumoto ...................... 707/1 |
| 2002/0099837 | A1 | 7/2002 | Oe et al. |
| 2002/0120755 | A1 | 8/2002 | Gomes et al. |
| 2002/0138756 | A1 * | 9/2002 | Makofka et al. ............. 713/201 |
| 2002/0146128 | A1 | 10/2002 | Mauro et al. |
| 2002/0162013 | A1 * | 10/2002 | Burnett et al. .............. 713/200 |
| 2003/0018912 | A1 | 1/2003 | Boyle et al. |
| 2004/0100972 | A1 | 5/2004 | Lumb et al. |
| 2004/0103202 | A1 | 5/2004 | Hildebrand et al. |
| 2005/0097318 | A1 | 5/2005 | Bolosky et al. |

OTHER PUBLICATIONS

Ellis Cohen and David Jefferson, "Protection in the Hydra Operating System", Proceedings of the Fifth Symposium on Operating Systems Principles, Nov. 1975, pp. i-ii, 141-160, Association for Computing Machinery, Inc., New York.

Lee Badger et al., "A Domain and Type Enforcement UNIX* Prototype", 5th UNIX Security Symposium, Jun. 1995, pp. 127-140.

H. Krawczyk et al., "HMAC-MD5: Keyed-MD5 for Message Authentication", Network Working Group Internet Draft, Mar. 1996, pp. i, 1-8.

Bart Preneel, "IP Authentication using Keyed MD5 / The ESP DES-CBC Transform", Katholieke Universiteit Leuven, Belgium, Jul. 1995, pp. 1-4.

P. Metzger, "IP Authentication using Keyed MD5", RFC 1828 (RFC1828), Aug. 1995, pp. 1-5.

International Search Report, PCT/US03/02716, International Searching Authority (ISA/EP) Apr. 4, 2003.

Hallyn, Serge E., Kearns, Phil, "Domain and Type Enforcement for Linux", [online], [retrieved on Sep. 21, 2004]. Retrieved from the Internet <URL: http://www.usenix.org/publications/library/proceedings/als00/2000papers/papers/full_papers, pp. 1-16.

International Search Report, PCT/US03/02716, Apr. 4, 2003, 4 pages.

Written Opinion, PCT/US03/02716, Nov. 11, 2003, 5 pages.

Park, J.S. et al., "Role-Based Access Control on the Web," ACM Transactions on Information and System Security, pp. 37-71, Feb. 2001, vol. 4, No. 1.

Cohen, E. et al., "Protection in the Hydra Operating System," Fifth Symposium on Operating Systems Principles, Nov. 19-21, 1975, pp. 141-160, [online] Retrieved from the Internet<URL: http://delivery.acm.org/10.1145/810000/806532/p141-cohen.pdf?key1=806532&key2=9644615511&coll=&dl=GUIDE&CFID=15151515&CFTOKEN=6184618>.

Spencer, R. et al., "The Flask Security Architecture: System Support for Diverse Security Policies," [online] Retrieved from the Internet<URL:http://www.nsa.gov/selinux/papers/flask/pdf>.

* cited by examiner

METHOD AND APPARATUS FOR IMPLEMENTING PROCESS-BASED SECURITY IN A COMPUTER SYSTEM

TECHNICAL FIELD OF THE INVENTION

The present invention relates in general to software security systems and, more particularly, to a process-based system for controlling access to resources in a computer system.

BACKGROUND OF THE INVENTION

Data processing systems have, as of recent, seen a large increase in the use thereof. For small users, such as home users, a typical system will run multiple programs that will allow access to various stored data files, allow the user to access resources such as disk drives, modems, faxes, etc. Access to these types of systems is typically what is referred to as "unrestricted", i.e., any one possessing the required knowledge to access a given program can access it on any unrestricted computer. However, for a larger data processing system that may contain confidential information, the user may be provided access to resources that are billed on a time-use, etc., these systems usually requiring restricted access.

In restricted access systems, a user is typically given an I.D. to the system. A system administrator can then configure a system, via a network or even a stand-alone system, to define the user's access to the system, once the user has logged in to the system. For example, in the network environment, there are a plurality of network drives, network resources such as printers, faxes and mailboxes, etc. The user has a configuration file that defines what access the user has. Upon logging in, the network will then access the configuration table and allow that user access to the given system resources. The user can then execute a program and utilize the program to access the resources through something as simple as a disk operating system (DOS). The disadvantage to this type of access is that the user now has full access to resources for any purpose, other than the purpose for which the user was given access.

As an example, a user may need access to a modem for the purpose of running database searching software. This database searching software allows the user to dial up a provider with the modem to perform predefined searching. In order for a prior restricted system to utilize the modem, the user must be granted access to a given serial port. However, the user need not run the database searching software in order to have access to the modem. This allows the user to run other programs that can gain access to the system. The disadvantages to this is that, although the database searching software may have certain restrictions that are inherent in the software itself, a user can bypass this system to utilize the modem for other purposes. This can also be the case with respect to data files, wherein a word processing program has the ability to read and write files and gain access to printers through the word processing software. However, this access must be granted in a global manner, such that the user can access the files and printers via any other means, once logged into the system.

As another example, consider a database that allows access to databases such as payroll, criminal records, etc., which a user has been given access. With current operating system security, the user can certainly go outside of a given program that is utilized with a specific database to copy, delete or even change files in the database outside of the program. As such, there exists a problem in that security for current operating systems provides that resources are allocated based on users or the groups to which the users belong. This therefore allows the user access to those resources even though the process that needs those resources is not being run. These rights will in turn allow the user to use the resource outside of its intended use.

In a general purpose computer system operating with a wide assortment of applications or processes, usually as part of a bundled package, security is based on the control of user access which allows access to all of the resources on the system whether they are needed or not. A disadvantage of this system is that it is not very secure and is prone to break-in or misuse of resources, some of which contain very sensitive information, primarily because of the unrestricted access to resources. All that is required to enter such a system is a user ID and a password. One solution, implementing process-based access to a general purpose computer system, where the access to each resource is controlled in addition to the entry of a user ID and password, would provide an additional level of access control. However, in a general purpose system running many applications with numerous resources, such a solution would be very cumbersome to implement and use as well as very inefficient in the use of system resources.

SUMMARY OF THE INVENTION

A dedicated, single purpose computer system is disclosed which typically operates with a predetermined set of a relatively small number of applications or processes and requires correspondingly fewer resources. In such a dedicated or single purpose system, a web server or a computer appliance-type machine, for example, lends itself readily to process-based security. In addition to the entry of a user ID and a password, the access to each of the resources needed by each application may be individually controlled with only minimal burden upon system resources. The present invention disclosed and claimed herein, in one aspect thereof, comprises a method for providing process-based security in a dedicated computer system configured with an operating system and at least one application program. The method comprises the steps of configuring the special purpose computer with an operating system and at least one application for operation as a computer appliance, associating a resource access table with the at least one application, addressable by the at least one application, containing statements corresponding to predetermined requests for access to a specified resource during running of an application wherein the resource access table statements include information defining an execution path for the application; interpreting the resource access table statements upon a request for the specified resource by the application, wherein at least one of the statements in the resource access table provides for performing a security check prior to granting access to the specified resource; and causing the execution of the application, upon granting access to the requested resource, including the use of the requested resource according to the execution path statements in the resource access table.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
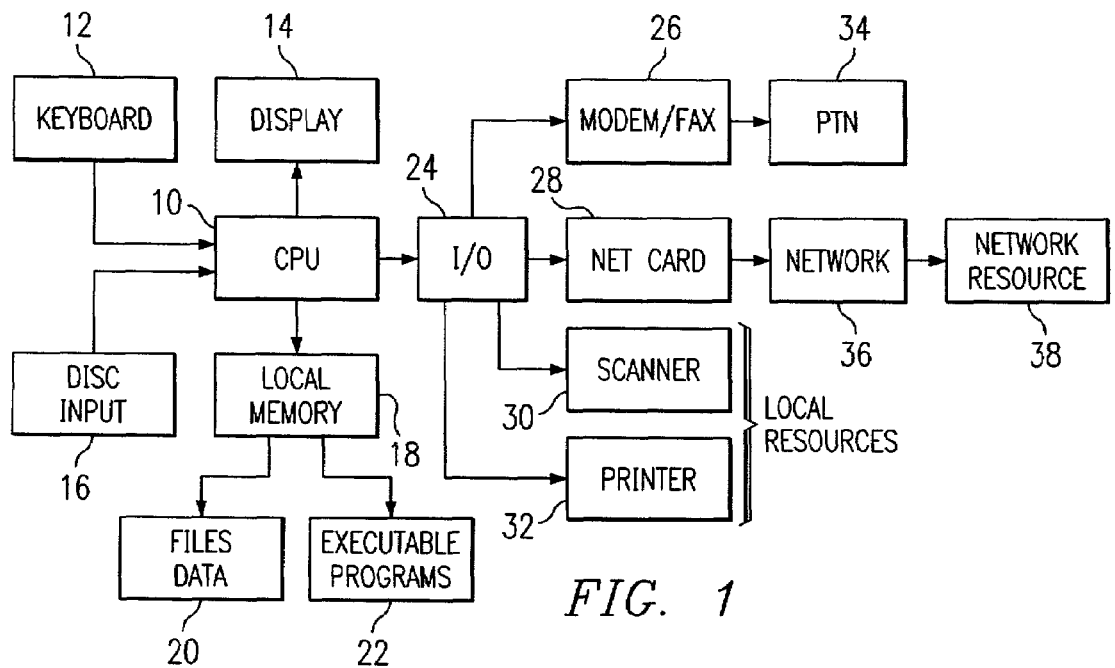
FIG. 1 illustrates a block diagram of an overall system.

Referring now to FIG. 1, there is illustrated an overall block diagram of a system for operating in conjunction with the security system of the present invention. A central processing unit (CPU) 10 is provided, which CPU 10 has associated therewith a microprocessor, peripheral circuitry, power supply, etc., all required to execute instructions and, in general, run programs. The CPU 10 has associated external therewith a keyboard 12 to allow the user to input the information thereto and a display 14. A disk input system 16 is also provided which allows the user to download and upload data. The CPU 10 also has a local memory 18 associated therewith, the local memory 18 being in the form of random access memory, read-only memory, and magnetic storage media such as a disk drive. The local memory 18 is operable to store both files in a region 20 and also execute programs in a region 22. The files in the region 20 can also consist of data for databases. The CPU 10 can then access the executable files in the program portion 22, execute the programs and access information in the form of files and/or data.

The CPU 10 also interfaces with peripheral resources through an Input/Output (I/O) block 24. The I/O block 24 allows access to such things as a modem 26, a network card 28, a scanner 30 and a printer 32. The scanner 30 and the printer 32 are referred to as local resources. The modem/fax 26, however, allows access to remote resources, such as a public telephone network (PTN) 34. The network card 28 allows access to a network 36, which in turn allows access to network resources 38.

Figure 2:
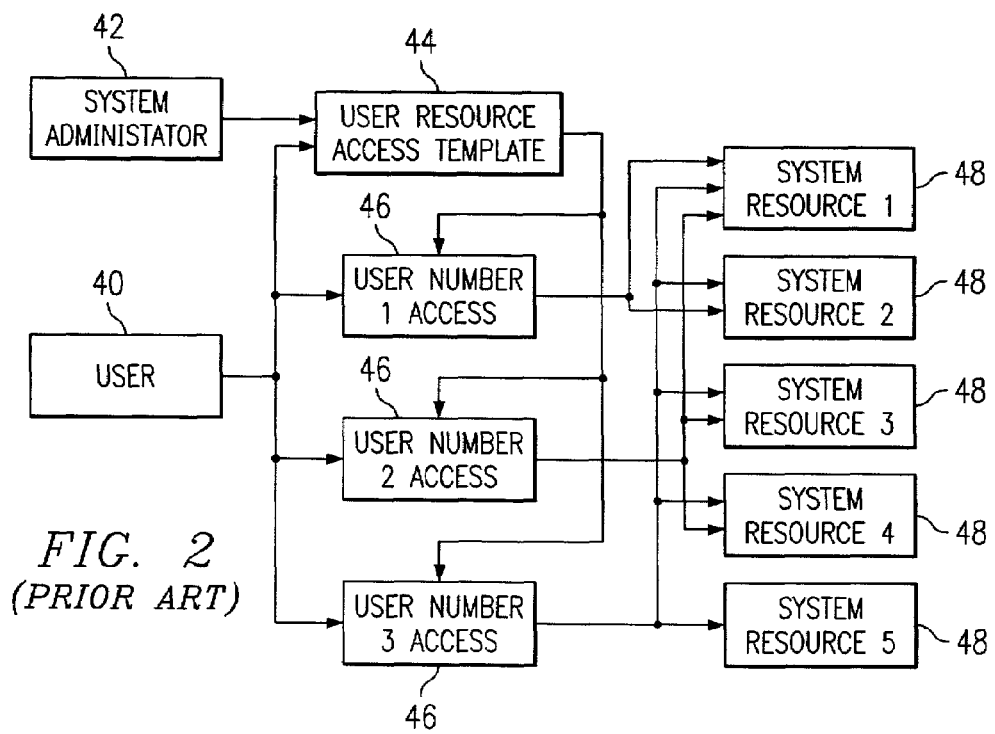
FIG. 2 illustrates a prior art security system.

Referring now to FIG. 2, there is illustrated a block diagram of a prior art security system. In prior art security systems, a user represented by a block 40 is allowed to access the system only upon providing the correct user I.D. A system administrator 42 is operable to pre-store configurations for the users in a user resource access template 44. This user resource access template is accessed whenever a user is brought into the system and attempts to log in to the system. Once the user logs in, each user is given a predetermined configuration, this referred to as user access blocks 46, there being one associated with each user. Each of these user access blocks 46 contain the configuration that was pre-stored by the system administrator 42 in the user resource access template. Once configured, this defines how the user is interfaced with the system, the system comprised of a plurality of system resources, represented by blocks 48. In the example illustrated in FIG. 2, there are provided five system resource blocks 48.

It can be seen in the prior art system of FIG. 2 that there are three user access blocks 46, representing three different user configurations, although there could be more, and five separate system resources, although there could also be more of these. The user access block associated with the user No. 1 is associated with system resource 1 and system resource 2. User access block 46 associated with user No. 2 has access to system resource No. 1, system resource No. 3 and system resource No. 4. Associated user access block 46 provides a configuration that allows user No. 3 access to system resource 1 through 5. It is noted that this is independent of the process upon which the user is working. The system resource is accessible by the user and not by the process.

Figure 3:
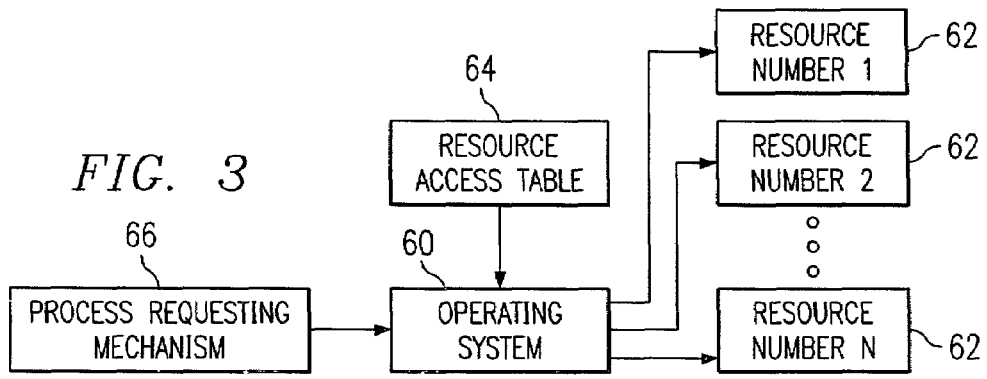
FIG. 3 illustrates a general block diagram of the system of the present invention.

Referring now to FIG. 3, there is illustrated an overall block diagram of the present invention. In the present invention, security is based upon a process. A process, such as a word processing program, a financial program, etc., each have certain needs related to the resources. For example, a payroll program, once accessed, would need to have access to its database. The program, however, typically does not allow as an inherent part thereof for the database to be copied, does not allow the database to be deleted nor manipulated in any manner other than that provided by the program itself. These may even have audit trails that cannot be bypassed. The present invention provides for security wherein the resource is only accessible through the step of executing and running the program. If the program is not running, the user does not have access to the given resource unless through another process which happens to have access to the resource.

Referring further to FIG. 3, a general operating system 60 is illustrated, this operating system being any type of operating system such as a Microsoft Windows based system, a UNIX system or even a DOS system. An operating system is the primary method by which a computer interfaces between the peripheral systems, such as memory storage devices, printers, modems and a process running on said computer. The user is then provided with a platform on which to run programs wherein the user can access the program and have the program access various peripherals through its interaction with the operating system. Operating system 60 therefore provides the necessary commands to access various resources 62 on the system. Again, these resources can be such things as a modem, a printer, a scanner, etc., even including a magnetic disk drive. The operating system is restricted to allocate only those resources defined in a resource access table 64, which resource access table defines resources associated with a given process, which association is based upon the process' needs.

The process expresses its need via a process requesting mechanism 66 which is an inherent aspect of process execution for any given process. The process requesting mechanism 66 initiates a request for a resource and, if the process running on the system has access to that resource, as noted in the resource access table 64, the operating system 60 will then grant the resource for use by the process within the operating system. If not, then the operating system will block access.

Figure 4:
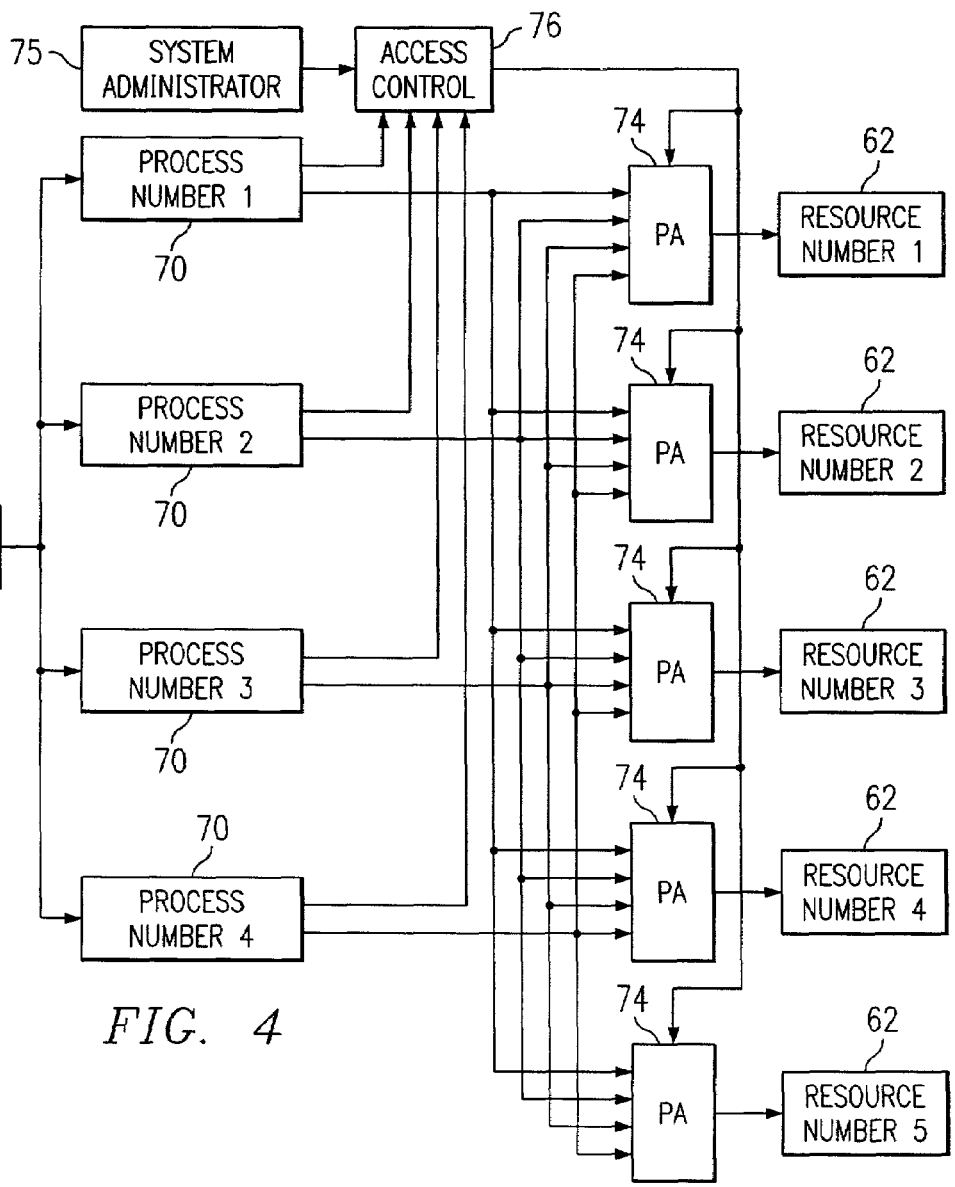
FIG. 4 illustrates a more detailed block diagram of the system of the present invention.

Referring now to FIG. 4, there is illustrated a more detailed block diagram of the process-based access system of the present invention. In general, a user block 68 is provided which indicates a user of the system. The user of the system can access any given process, being illustrated for processes in process blocks 70. Each of the process blocks 70 is connected to a process access selector 74, each of which is associated with one of the resource blocks 62, there being illustrated five resource blocks 62. The process access selector 74 is operable to potentially allow any process to address that process access selector 74. An access control block 76 is provided that receives as inputs an indication of which of the processes in process block 70 is running. A System Administrator block 75 is provided to allow a System Administrator to set the parameters of the access control block. The access control block then selects which of the process access selector blocks 74 is authorized to have access to a given resource. It is important to note that it is a request from a process block 70 during the running of that process that is utilized by the access control block 76 to grant access to the process access selector 74.

By way of example, if a word processing program were being operated and, on the same computer, a user had the ability to operate an accounting program, the word processor would be provided access to certain regions on a disk and the files associated therewith. The user could retrieve these files, delete them, modify them and restore them. However, the user would not be allowed through the word processor to access the accounting database for any purpose, since the process does not require this. In another example, if a modem were provided, this would not usually be a resource that was available to a word processor. The modem would, for example, only be accessible to a communications program.

In another example of the operation of the process based security system, where resources are permitted access only in association with the particular process that is selected, reference is made to Table 1, which is an example of the resource access table 64 of FIG. 3:

sents a user, on a computer, who can log into a network, but has not done so. In essence, the user can do anything with their local resources, but nothing with network resources, until they are identified to the network with the login program.

In step 2 in Table 1, when the user executes the E:\LOGIN\LOGIN.EXE process, the process changes from something on C:\ to LOGIN.EXE which can read the E:\SYSTEM\PASSWORDS file and execute the E:\PROGRAMS\MENU\MENU.EXE program. The file LOGIN.EXE is the network's method of identifying users of the network. Execution of LOGIN.EXE will verify the user through its read-only access to the E:\SYSTEM\PASSWORDS file. If the user is verified as a valid user, LOGIN.EXE will pass control on to step 3 and the process E:\PROGRAMS\MENU\MENU.EXE.

In step 3, when MENU.EXE gets executed, it will read the appropriate menu options from its SCREENS file and display it for the user. MENU.EXE controls what programs can be executed and as such, it has been given rights to execute any program in the E:\PROGRAMS directory or any of E:\PROGRAMS sub-directories (this is denoted with the /S option after the partial wild card name *.EXE and *.COM).

In step 4, in the event the user executes the WP.EXE program, this process has full access to a local F:\LIBRARY directory, a shared G:\COMMON directory and the sub-directories of G:\COMMON. The example in step 4 may also represent a network, where personal files are stored in a user-related directory (F:\LIBRARY) and company shared documents are stored in a common directory (G:\COMMON).

In the preceding example, it can be seen that the user cannot, for example, obtain access to the PASSWORDS file by any other process except for the LOGIN.EXE process and this process determines how the user can deal with that particular file.

Figure 5:
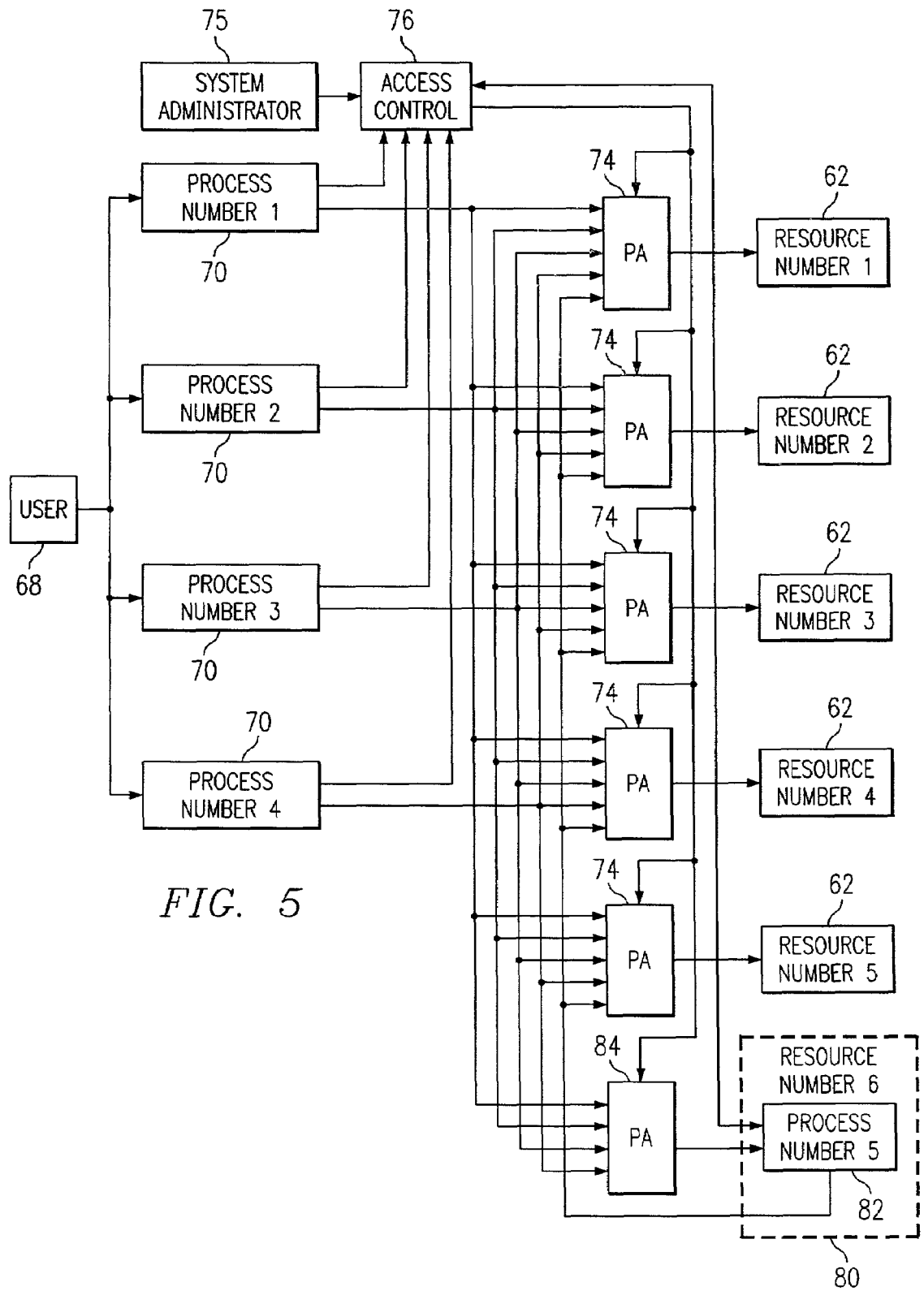
FIG. 5 illustrates an alternate embodiment of the system of the present invention.

Referring now to FIG. 5, there is illustrated an alternate embodiment of FIG. 4, illustrating how a particular process can constitute a resource. The resource blocks include a

TABLE 1

| Step | Process name | Resource name | Rights Mask |
|------|--------------|---------------|-------------|
| 1 | C:\*.*/S | C:\*.*/S | Full access |
|   |   | E:\LOGIN\LOGIN.EXE | Execute only |
| 2 | E:\LOGIN\LOGIN.EXE | E:\SYSTEM\PASSWORDS | Read only |
|   |   | E:\PROGRAMS\MENU\MENU.EXE | Execute only |
| 3 | E;\PROGRAMS\MENU\MENU.EXE | E:\PROGRAMS\MENU\SCREENS | Read only |
|   |   | E:\PROGRAMS\*.EXE/S | Execute only |
|   |   | E:\PROGRAMS\*.COM/S | Execute only |
| 4 | E:\PROGRAMS\WP51\WP.EXE | F:\LIBRARY\*.* | Full access |
|   |   | G:\COMMON\*.*/S | Full access |

The example in Table 1 illustrates a general personal computer of the clone type, running an MS DOS operating system which is attached to a network with a process based security. When the computer is started, any process with the C:\ drive (denoted with the wild card processing of *.*) and its sub-directories (denoted with the \S option on the end of the process name) is provided full access to anything on the C:\ drive (once again denoted with the wild card resource name of *.*) and its sub-directories (once again denoted with the \S option on the end of the resource name). The user can also execute the process E:\LOGIN\LOGIN.EXE from the network. All other resources from the network are not available to the computer at this time. This situation represents resource block 80 which constitutes a sixth resource, in addition to the five resource blocks 62. However, this resource also has a process block 82 disposed therein, which constitutes a fifth process. Access to this process block 82 is facilitated through the use of a process access block 84, similar to the process access block 74, and controlled by access control 76. Each of the processes in process blocks 70 have access to the process block 82 and the resource block 80 through the process access block 84. Therefore, if one of the processes in process blocks 70 were running and the access control block 76 allowed access through a process access block 84, then process No. 5 in resource block 80 could be run. This, of course, would then allow process block 82 and the process #5 associated therewith to request and receive access to any of the resources in resource blocks 62 associated with process access block 74 in accordance with the access control information in access control block 76. Although illustrated as only a single process that is accessed by another process, there could be many processes deep, such that three or four processes would need to be run before a given process was accessible which, in turn, could access an end resource.

It is important to note that the process must be running and, during the running thereof, execute instructions that request a given resource. It is the running of the process and the request by that running process that allows access to a resource. The fact that the process has been opened and initiated is not sufficient to gain access to the resource since it is the use of the resource by a given process that is selected. For example, if a multi-tasking operating system were utilized and a given program executed from that platform as a first task, it may be desirable to place that task in the background and initiate a second task. Even if the first task were running in the background, the ability of the first task to request a given resource does not in any way effect the rights of the second task to have access to that same resource. Unless it is in the resource access table, no access to the resource will be allowed. Even if the first task were operating and it were utilized to "launch" a second process, this would not effect the resource access of the launched process, since when the launched process is running, the launching process is not running and it is not the launching process that is requesting access to the resource. Therefore, it is only the requesting resource that is of concern.

Figure 6:
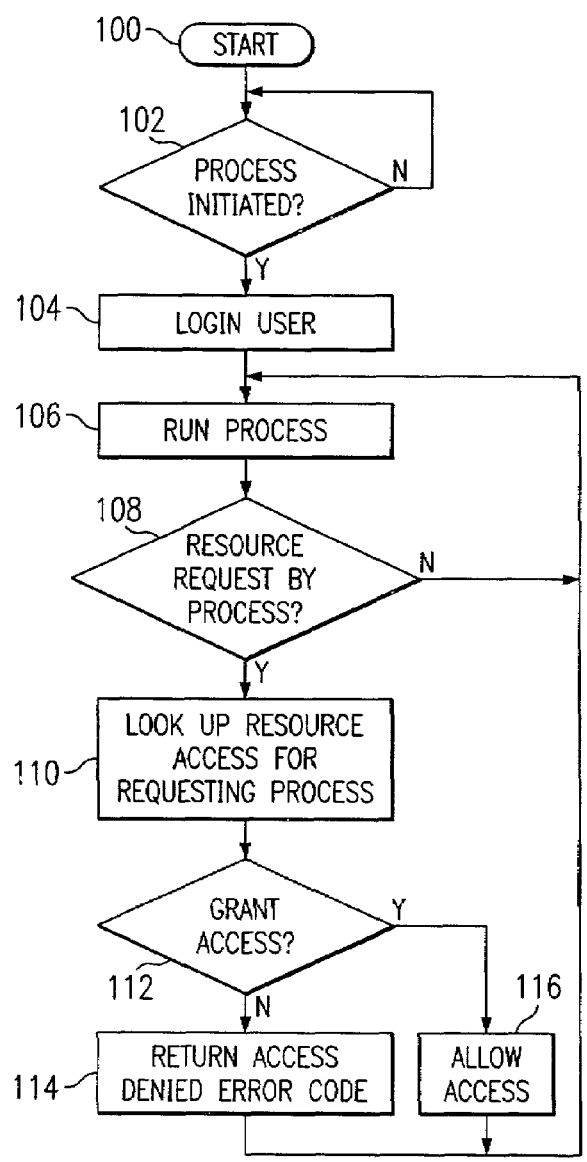
FIG. 6 illustrates a flowchart depicting the operation of the present invention.

Referring now to FIG. 6, there is illustrated a flowchart depicting the overall operation of the system. The program is initiated at a start block 100 and proceeds to a decision block 102. The decision block 102 determines if a process has been initiated. If not, the program flows back around an "N" path to the input of decision block 102. When a process has been initiated, the program will flow to a function block 104 to log in the user. The log in procedure is a procedure that may be utilized, but can be optional. In and of itself, as described above with reference to Table 1, the log in process is a separate process in and of itself. However, some programs by themselves, require log in procedures, i.e., accounting systems. Therefore, this is an optional block.

After the log in block 104, the program will flow to a function block 106 to run the process. Once the process is running, the program then flows to a decision block 108 to determine if a resource request has been made by the running process. If not, the program will flow along the "N" path back to the input of function block 106. When a resource request has been made by the running process, the program will flow from decision block 108 along a "Y" path to a function block 110, wherein the resource access table is accessed to determine access rights for the requesting process. The program will then flow to a decision block 112 to determine if access has been granted for that particular resource. If not, the program will flow along a "N" path to a function block 114 to return an "access denied" error code. The program will then flow back to the input of function block 106. However, if access rights have been granted in accordance with the resource access table, the program will flow along a "Y" path from decision block 112 to a function block 116 to allow access to the system and then back to the input of function block 106. This will continue unless the resource is halted.

Figure 7:
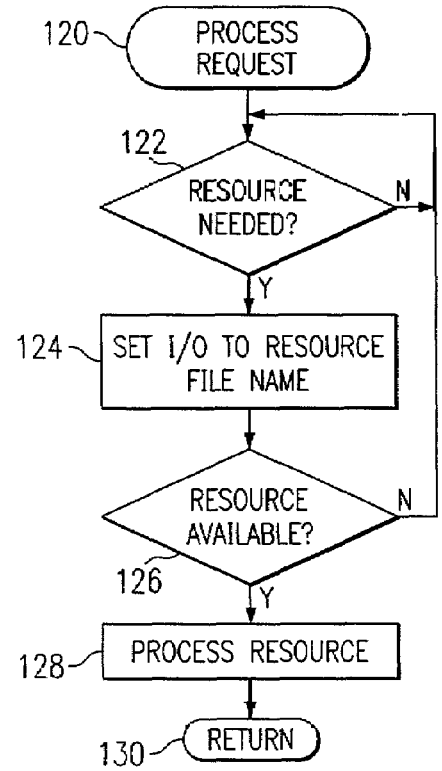
FIG. 7 illustrates a flowchart depicting the resource request by the process.

Referring now to FIG. 7, there is illustrated a flowchart depicting the resource request by the process, as in step 108 of FIG. 6. The flowchart is initiated at a block 120 and then proceeds to a decision block 122, wherein the process determines if a resource is needed for the process. If not, the program flows along an "N" path back to the input of decision block 122. If a resource is required, the program will flow along a "Y" path to a function block 124. The function block 124 then determines the ID for the resource and then generates the request, this request defining the resource that is required and also the mode of access that is required. The program will then flow to a decision block 126 to determine if the resource is available. If not, the program will flow along an "N" path back to the input of decision block 122. If it is available, the program will flow along a "Y" path to a function block 128 to process the resource in accordance with the operation of the process and then flow to a return block 130.

Figure 8:
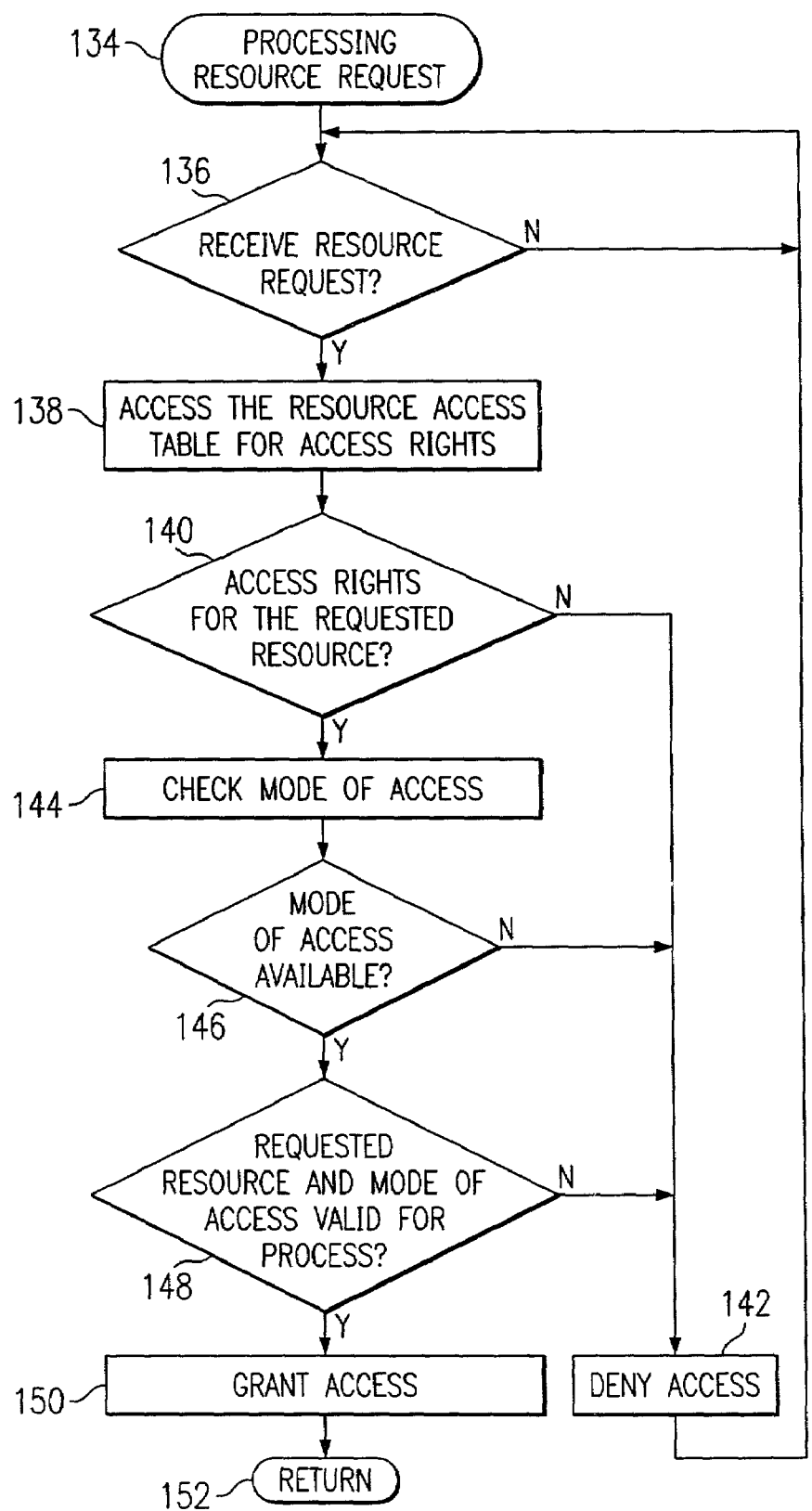
FIG. 8 illustrates a flowchart depicting the processing of the request by the operating system.

Referring now to FIG. 8, there is illustrated a flowchart depicting the operation of the operating system when processing a request for a resource. This is initiated at a block 134 and then proceeds to a decision block 136. The decision block 136 determines whether a resource request has been received from a process operating in conjunction with the operating system. If not, the program will flow along an "N" path back to the input of decision block 136. If a resource request has been received, the program will flow along the "Y" path to a function block 138. Function block 138 fetches the information stored in the resource access table to determine if the particular resource has any access rights associated therewith. The program will then flow to a decision block 140 to determine if access rights are present in the resource access table for the requested resource. If not, the program will flow along the "N" path to a function block 142 wherein a "NULL" signal is sent back to the requesting process to deny access and then to the input to decision block 136.

If access rights exist in the resource access table for the given resource, the program will then flow to function block 144 to determine if the mode of access that is requested by the requesting process is present in the resource access table, i.e., whether the resource access table has been set up to grant this mode of access to the given resource. An example of this would be a file that is defined as the resource with the modes being READ and WRITE, with either reading of the file from the disk or writing of the file to disk. The program will then flow to a decision block 146 to determine if the mode of access is available. If not, the program will flow along the "N" path back to the function block 142 and, if the mode of access is available, the program will flow along the "Y" path to a decision block 148 to determine if the requested resource and mode of access are valid for the requesting process. For example, a process may request access to a particular memory device or portion of a memory device and it may require access to that memory device for writing of information thereto. The system will first determine if the resource has access rights associated therewith and then check to see what mode of access is allowed. In this example, if the resource is available, it may have a mode of access available for reading and a mode of access available for writing. However, the resource access table may only grant reading rights to the requesting process. In this event, access will be denied. This is represented by the path that flows along the "N" path back to function block 142. If access is allowed, the program will flow along a "Y" path from decision block 148 to a function block 150 to grant access and then to a return block 152. The following is the process flow for the process generating the request:

```
id = fopen ("filename", "rt");     ← This is the request to
                                     the operating
                                     system for the file
                                     access (resource).
if (id == NULL)
{
  file not available
}
else {
  process the opened file
}
```

The following is the process flow for the operating system when servicing the request:
Operating System

```
FILE *fopen (char *name, char *mode)
{
    (before checking for the presence of the file,
    check to see if the process has any rights to the file.)
for (i = ø; i<SIZE_OF_ACCESS_TABLE; i++)
    if (check (name, accesstable [i]. resource) == ø)
    break;
if (i == SIZE_OF_ACCESS_TABLE) return NULL; (no rights at all)
for (j = ø; j<accesstable [i]. rights_size; j++)
    if (check (mode, accesstable [i]. rights[j]. Mode) == ø)
    break;
if (j == accesstable [i] rights size) return NULL; (specific right not
present)
    (the remaining code deals with what the operating
    system needs to do to allocate the file to the calling
    process (note additional errors may still occur, like
    file not found)).
}
```

The foregoing describes a system for providing process-based security to an operating system. In this security system, access to any resource on the system, although provided by the operating system, is restricted by the operating system to only those requested by a given process. Whenever a process, during operation thereof with the operating system, requires or requests access to a resource, the operating system makes a determination as to whether a resource can be made available for that given process. This is facilitated by storing access rights for any process in a resource access table. When a process is running on the system and it requests for its use a given resource, the operating system will then look up in the resource access table to determine if the resource is available and, if so, grant access to the resource.

It has been described hereinabove that a process-based security system controls access to resources via the process (i.e., application) that requests the resource. Experimentation and development have shown, however, that such a security system is more efficiently implemented in a dedicated, or single-purpose environment, such as a web server, or other, computer appliance-type of application. In a general purpose system, where user-based access is the standard and allows the user access to all resources, it may not be as easy to justify limiting access based on process because so many processes may be available, making the process-based access more complex, or less efficient and perhaps redundant due to the complexity and global scope that might be required for implementation in a general purpose system.

Thus, it can be appreciated that the process-based security described hereinbelow, as applied to a dedicated, single purpose computer system, could exhibit the following advantages:

(1) prevent a user from loading their own applications into the system;
(2) prevent a user from attempting to access files from uncontrolled processes, e.g., trying to load in a hex editor to obtain access to the sensitive files such as accounting records, etc.;
(3) prevent access to all the resources in a system, even though individual resources are needed by a particular program or process;
(4) process-based security, in a dedicated environment, is self contained, i.e., independent of the rest of the system, and is thus relatively easy to implement in existing systems;
(5) process-based security is context-specific and can be made to be dynamic by the way in which resource access is interpreted; and
(6) in a process-based security system, the user only has the right to execute a specific application or process and that process includes access rights only to specific resources keyed to the requesting process.

Figure 9:
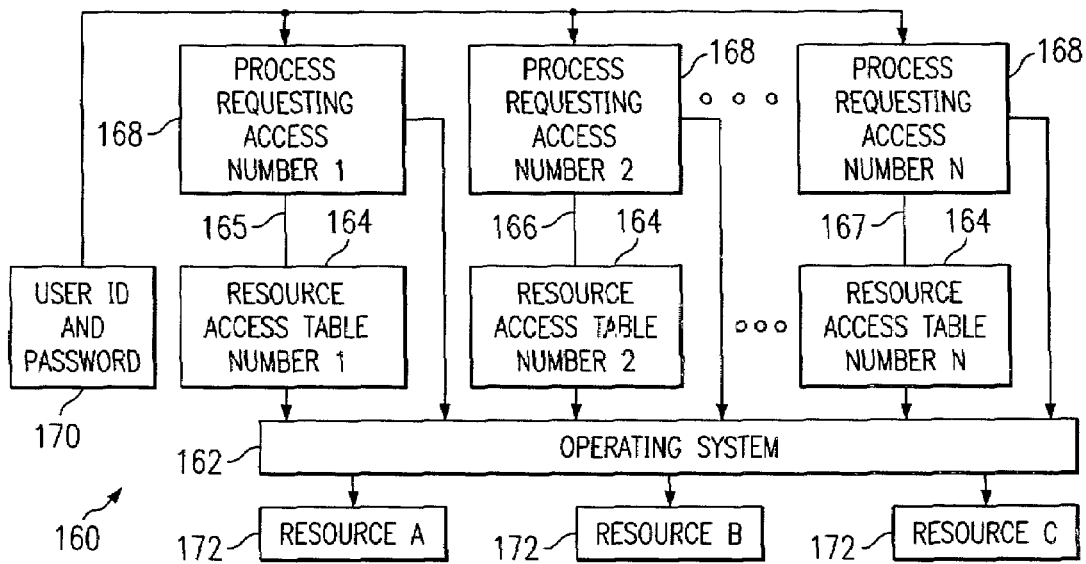
FIG. 9 illustrates a functional block diagram of an embodiment of a process-based security system according to the present disclosure.

Referring to FIG. 9 there is illustrated a functional block diagram of an illustrative embodiment of a process-based security system according to the present disclosure. A portion of the functional aspects of a complete computer system 160 is shown having an operating system 162 coupled with a plurality of resources indicated by the three blocks identified by reference number 172, respectively resource A, resource B and resource C. In general, resources 172 may be various types of input and/or output devices or application programs installed on a particular system. I/O device resources may include a keyboard, mouse, scanner, display, modem, disk drive, printer, or an interface to a network, etc. Application, or process type resources may further include a word processor, a spreadsheet, a communication or e-mail program, a database, a search engine or browser and the like. Continuing with FIG. 9, each process requesting access 168 is bound to a resource access table (RAT) 164 via respective links 165, 166 and 167. The resource access tables 164 contain entries or statements that may be expressed in a high level programming language. Further coupled as inputs to operating system 162 are the plurality of processes requesting access 168, i.e., applications running on system 160 as indicated by process requesting access 1, process requesting access 2 and so on to process requesting access N. In the description to follow, the words application and process will be used interchangeably, referring generally to an application program as distinguished from an operating system. Such application programs are provided to accomplish specific operations such as spread sheets or word processing or communications and the like. In general, each of these processes or applications 168 will, during their operation, require access and use of various ones of the resources 172 coupled to the operating system 162 of the computer system 160 of the present disclosure. Coupled as inputs to the various processes 168 or applications 168 is provision for entering a user identifier and/or password for each respective process 168 or application 168 that will be requesting access to a resource as will be described further hereinbelow. The entry of the user identifier and/or password is represented by the functional block 170 user ID and password.

Referring further to FIG. 9, an operating system 162 for computer system 160 is illustrated, such as a Microsoft Windows based system, a UNIX system, a DOS system or the like. An operating system is the primary method by which a computer interfaces with the various resources including, for example, the peripheral systems such as memory storage devices, printers, modems and a process or application running on said computer. The operating system 162 provides the user with a platform on which to run programs, i.e., applications or processes 168 wherein the user can access the program and have the program access various peripherals through its interaction with the operating system. Operating system 162 therefore provides the necessary commands to access various resources 172 on the system. Further, the operating system 162 is restricted to allocate only those resources defined in the resource access tables 164, which define resources 172 to be associated with a given process 168, based upon the needs of the process 168.

The operating system 162 (OS 162) receives as inputs an indication of which of the process blocks 168 is running. In one embodiment the OS 162 may include or be responsive to a System Administrator function to set the parameters of the access control for the resources 172. The OS 162 in conjunction with the resource access table 164 then selects which of the resources 172 is authorized access. It is important to note that it is a request from a process 168 during the running of that process 168 that is utilized by the OS 162 to grant access to the resource access table 164.

Continuing with FIG. 9, the functional block 170 indicates both a user of the system and information that may be provided by the user to gain access to the system or its resources. The user of the system can access any given resource appropriate to the application that is provided in the dedicated system. In general, a process or an application is an executable file which may be referred to as "*.EXE", the "*" defining a wild card name of one or more characters representing an executable file or program. For example, one well known word processing program has an executable file name of WP.EXE. The user can enter the term "WP" and "launch" that program. The program will then run in a conventional manner.

In operation of the system 160 of FIG. 9, by way of example, if a word processing program were being operated and, on the same computer, a user had the ability to operate an accounting program, the word processor would be provided access to certain regions on a disk and the files associated therewith. The user could retrieve these files, delete them, modify them and restore them. However, the user would not be allowed through the word processor to access the accounting database for any purpose, since operation of the word processor process does not require this. In another example, if a modem were provided, this would not usually be a resource that was available to a word processor. The modem, for example, could only be accessed by a communications program.

In an example of the operation of a process based security system, reference is made to Table 2:

For purposes of illustration, the example in Table 2 applies to a personal computer (PC) which is attached to a network and running an MS DOS operating system that is provided with process-based security. Although a PC is usually considered a general purpose system, the simplicity of the illustration provided by Table 1 applies equally well to a dedicated computer system. When the computer is started, as in step 1 in Table 1 described previously, any process to be run with the C:\ drive (denoted with the wild card designation *.*) and its sub-directories (denoted with the /S option on the end of the process name) is provided full access to any resource on the C:\ drive. Note also that the user can execute the resource E:\LOGIN\LOGIN.EXE from the network but that all other resources from the network are not available to the computer at this time as being limited by the statement E:\LOGIN\LOGIN.EXE. This statement will be described further in the next paragraph. This example, so far, represents a user, on a computer, who can log into a network, but has not done so. In essence, the user can do anything with his or her local resources, but nothing with network resources, until they are identified to the network with the login program.

In step 2 in Table 2, when the user executes the E:\LOGIN\LOGIN.EXE process, the process changes from something on C:\ to LOGIN.EXE which is permitted to read the E:\SYSTEM\PASSWORDS file and execute the E:\PROGRAMS\MENU\MENU.EXE program. The file LOGIN.EXE is the network's method of identifying users of the network. Execution of LOGIN.EXE will verify the user through its read-only access to the E:\SYSTEM\PASSWORDS file. If the user is verified as a valid user, LOGIN.EXE will pass control on to step 3 and the process E:\PROGRAMS\MENU\MENU.EXE.

In step 3, when the file MENU\.EXE is executed, it will read the appropriate menu options from its SCREENS file and display it for the user. MENU.EXE controls what programs can be executed and as such, it has been given rights to execute any program in the E:\PROGRAMS directory or any of E:\PROGRAMS sub-directories (this is denoted with the /S option after the partial wild card name *.EXE and *.COM as listed in the resources column of Table 2). In step 4, in the event the user executes the WP.EXE program, this process has full access to a local F:\LIBRARY directory, a shared G:\COMMON directory and the sub-directories of G:\COMMON. Step 4 may also represent a network, where personal files are stored in a user-related directory (F:\LIBRARY) and company shared documents are stored in a common directory (G:\COMMON).

In the preceding examples illustrated by Table 2, it can be seen that the user, because of the table which must be accessed during a resource request, cannot obtain access to

TABLE 2

| Step | Process or application name | Resource name | Rights Mask |
|---|---|---|---|
| 1 | C:\*.*/S | C:\*.*/S | Full access |
|   |   | E:\LOGIN\LOGIN.EXE | Execute only |
| 2 | E:\LOGIN\LOGIN.EXE | E:\SYSTEM\PASSWORDS | Read only |
|   |   | E:\PROGRAMS\MENU\MENU.EXE | Execute only |
| 3 | E;\PROGRAMS\MENU\MEMU.EXE | E:\PROGRAMS\MENU\SCREENS | Read only |
|   |   | E:\PROGRAMS\*.EXE/S | Execute only |
|   |   | E:\PROGRAMS\*.COM/S | Execute only |
| 4 | E:\PROGRAMS\WP51\WP.EXE | F:\LIBRARY\*.* | Full access |
|   |   | G:\COMMON\*.*/S | Full access | the PASSWORDS file by any other process except via the LOGIN.EXE process. This process also determines how the user can deal with that particular file.

Figure 10:
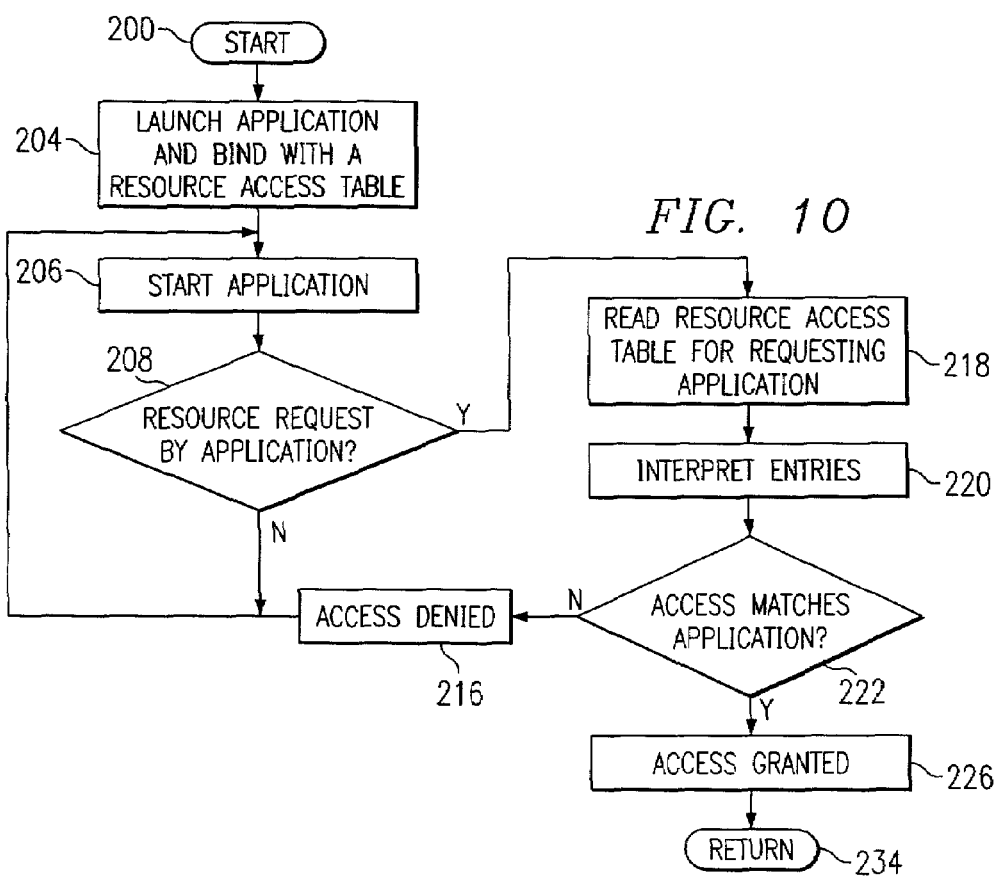
FIG. 10 illustrates a flowchart of the operation of the embodiment of the process-based security system of FIG. 9.

Referring now to FIG. 10 there is illustrated a flowchart of the operation of the illustrative embodiment of the process-based security system of FIG. 9. The flow begins with the Start block 200 and proceeds to block 204 to load the application program. From block 204 the flow proceeds to block 206 to start the application which is followed by decision block 208 to determine whether a resource is requested by the application. If the result of the determination is negative then the flow follows the N path back to the entry to the Start Application block 206. If the determination in block 208 is affirmative then the flow proceeds to block 218 wherein a step to read the respective resource access table 164 for the requesting application 168 is performed.

Continuing further with FIG. 10, upon reading the resource access table 164 for the requested application in block 218 the flow proceeds to block 220 wherein the system 160 interprets the entries or statements in the resource access table 166 to identify the commands of the execution path and the sequence of operations contained in it. The flow thereupon proceeds to decision block 222 wherein a determination is made as to whether the request for resource access matches the application in operation. If the determination is negative, then the flow proceeds to block 216 wherein access is denied and thereupon is routed back to the start application block 206. If, however, the determination in decision block 222 is affirmative, then the flow proceeds along the Y path to block 226 wherein access is granted to the requested resource and the flow returns to the main program to execute the application or process as indicated at block 234. It will be appreciated that the security access is provided by the reading and interpreting of the resource access table 164 entries or statements which specify the resources needed for the particular application or process and the execution path for access to those resources. Thus, access to resources is limited to only those resources that are needed and requested by the particular application or process that is in operation.

A study of FIGS. 9 and 10 described hereinabove will reveal the following operational characteristics of a process-based security system for dedicated or single-purpose computer systems. Upon launching an application in a process-based system, the access rights are associated or bound to the launched application as indicated by links 165, 166 and 167 in FIG. 9. During the request for access to the needed resource(s), the access rights associated with that program are checked. In a general purpose system, security checks impede processing by interrupting the OS while the security check is performed each time a user requests a resource. In a dedicated system running one process or a single process combination, only one request for resource access is required; if several process combinations are provided, the system selectively allows access to the resources appropriate to the process requesting access. In either case, the request occurs during the initial steps of the process. Further, the security access is performed by matching the conditions present upon launching the application such as the program identity, user identity and password, execution path through the directory, etc. with the resource access entries or statements in the respective resource access table 164. Once the application is launched, read and write calls are no longer checked, and the resource access table 164 controls "the traffic"—the execution path through the directory. As an example, in a web server application, the steps, briefly, would be: (1) turn on the web server; (2) launch the application, (3) read and interpret the resource access table entries; (4) grant the needed access; and (5) execute the application, including the allowed resources.

During the interpretation step 220 of FIG. 10 of the illustrated embodiment, resource access table entries are interpreted, one character at a time, instead of merely reading a resource name associated with a listed process or merely making a string comparison, because of the presence of meta symbols embedded into the entries in the respective resource access table 164. Meta symbols, as disclosed herein, are textual devices which may be inserted into resource access table entries as second-order data or instructions to supply additional related information or modify the interpretation of the entry in some way. In the comparison process to find a resource in the resource access table, entries do not have to be static. Entries in the resource access table can have meta symbols to allow for context sensitivity to the process making the request. Table 3 presents some examples of meta symbols developed for the embodiment of the present disclosure which may be included in a resource access table entry. Meta symbols are assigned—and construed—in a UNIX environment.

TABLE 3

| Meta Symbol | Definition/Meaning |
| --- | --- |
| $P | If the requested resource name matches to this point, consider the entry a match (path wild-card). |
| $C | The particular character in the requested resource name matches this symbol no matter what (character wild-card). |
| $D | For a single level of depth in the directory, this symbol means a match (directory wild-card). |
| $$ | Requested resource name must match a $ at this point. |
| $S | Requested resource name must end (suffix) in the text following this symbol. |
| $U | Requested resource name must have the user name of the user that initiated the process making the request, at this point. |
| $G | Requested resource name must have the group name of the group that initiated the process making the request, at this group. |

As described in the foregoing, to provide process-based security access in a single-purpose "appliance" computer system, a resource access table (RAT) is bound to, i.e., associated with, the requesting process when the process or application is launched. The RAT contains entries in which the defined execution paths, i.e., process paths, are modified using meta symbols. These meta symbols provide instructions for interpreting the process or execution paths. For example, meta symbol entries enable the system to determine which part(s) of an entry in a RAT must be matched character-by-character to produce a valid comparison or which part(s) may be ignored or which part(s) has a substituted instruction, etc., in order to be granted the security access rights associated with that particular entry in the RAT. Each entry or statement in the RAT may correspond to a resource whose access is defined by the entry.

For example, an unmodified entry in a RAT might appear as:

PROGRAMS/WP/WP.EXE and the resources to be associated therewith might be:

/HOME/$U/$P.

So, when a user initiates a program operation the command string is compared to the RAT entry. In this example, the meta symbol $U means that the current user name is substituted into the entry and permitted access to the respective resource. Similarly, the $P modifies the RAT entry and means that the rest of the path is ignored, i.e., it is "matched" no matter what the rest of the path is.

EXAMPLE NO. 1

Figure 11:
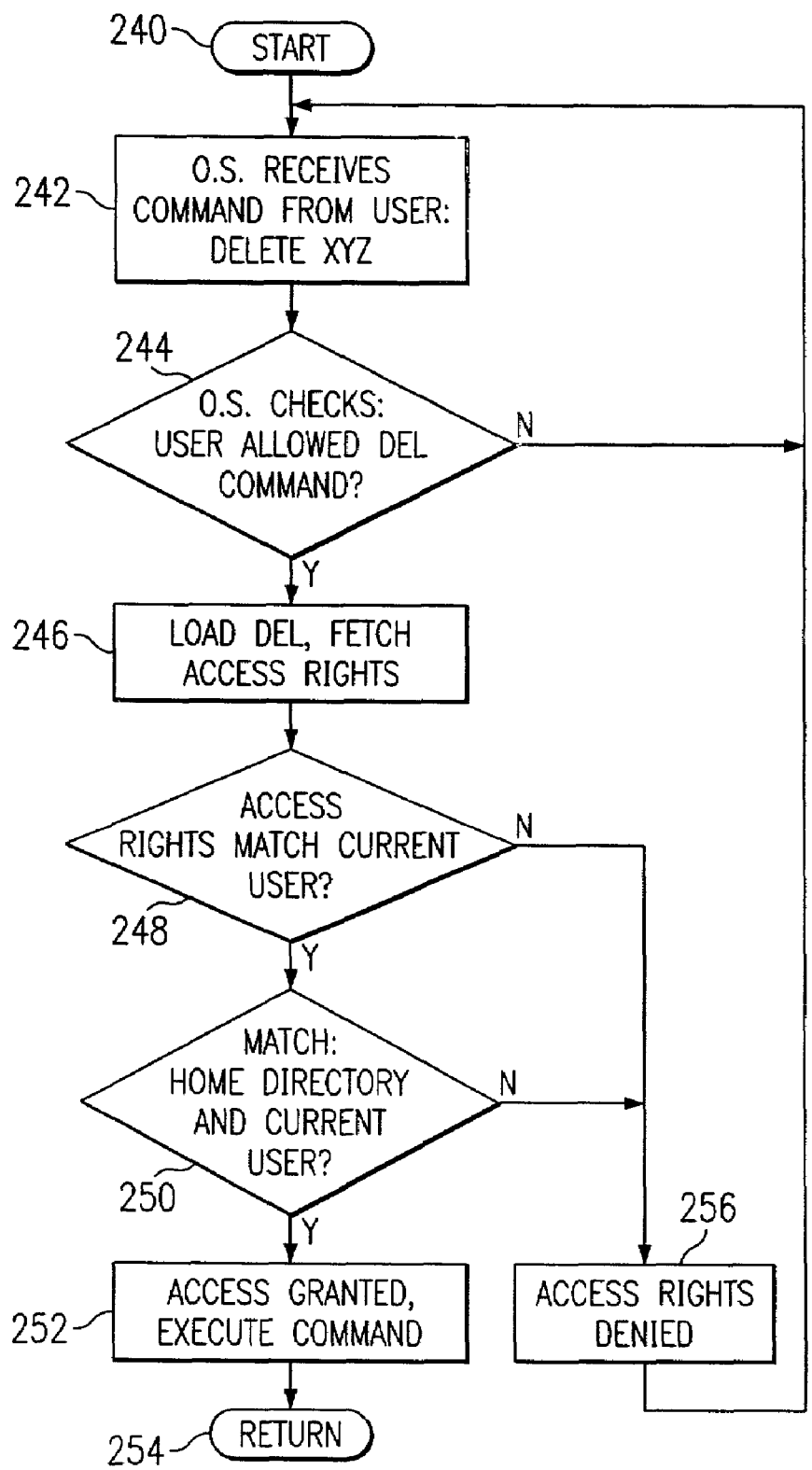
FIG. 11 illustrates a flowchart of an example of use of a resource access table according to the embodiment of FIG. 9.

Referring now to FIG. 11, suppose the user Q is operating in the home directory and wishes to delete a file xyz. In FIG. 11, the perspective is that of the operating system. The routine begins with the start block 240 and proceeds to function block 242 wherein the operating system (OS) receives a request to run DEL program. Thereafter the OS checks in block 244 whether the current user is allowed a DEL command. If not, the flow follows the N path and returns to enter block 242. If so, the flow proceeds to block 246 to load the DEL command and fetch the corresponding access rights from the resource access table (RAT) 166. In this case the RAT 166 entry is the statement: /HOME/$U/$P which defines access rights in the HOME directory for the $U current user within which access is allowed $P from this point on, i.e., is unrestricted in directory depth per Table 3.

Continuing with FIG. 11, in the next step, at decision block 248, the OS determines whether the access rights match the current user and if affirmative, the flow proceeds along the Y path to another decision block 250. There, if both the HOME directory and the current user $U are matched, the routine advances to block 252 where access is granted and the DEL command is allowed to be executed. The routine returns to the main program in block 254. In either case, in blocks 248 or 250, the result is that a match did not occur, access is denied and the routine returns to the entry of block 242.

EXAMPLE #2

Suppose the user is operating in the HOME directory, and wishes to run a word processor (e.g. WordPerfect). The word processor program (application or process) is in the directory: /PROGRAMS/WP/WP.EXE. Here, the resource access table statement is: /HOME/$U/$S.WP, where $S is used as an intervening suffix. This statement limits access to files in the user's home directory (/HOME/$U/) that end in the characters .WP ($S.WP).

It will be appreciated in the foregoing example that any resource can be moved to any place in an execution path it is desired, merely by defining the access rights for that path in the Resource Access Table. Thus, the access rights "move" with the new placement of the resource. Further, many resources, e.g., utility programs, can be wild carded into part of an execution path. In effect, these programs are executed, not out of the original program or process but out of the resource access table 166. This provides a simple way to limit access rights—merely by statements in the resource access table. Moreover, since the substituted directory path identified the word processor WP in its execution path—and not some other resource such as an EXCEL program—access rights to EXCEL (or any other program that may be part of the system) are excluded from the WP program execution path.

Suppose, alternatively, the user is running EXCEL and wishes to use a spell check resource. Unless that spell check resource, which resides in the WP program, is included in the allowed access rights of the RAT entries for the EXCEL program any user attempt to access it from EXCEL will be denied. It will thus be appreciated that the process-based security described hereinabove provides the advantages of (1) preventing users from loading their own applications on a dedicated system configured according to the present disclosure; and (2) preventing users from attempting to access files via uncontrolled ways such as trying to load in a hex editor, e.g., to obtain access to accounting or other sensitive files.

EXAMPLE NO. 3

Consider a web server (WS) which can execute any common gateway interface (CGI) serving a plurality of companies, e.g., A, B, C, D, E and F. Prefixing is used to distinguish whose CGI is allowed execution (e.g., ABC/CGI for access to ABC/DATA directory but which may exclude DEF/CGI) by substitution according to a $E(#) meta symbol that identifies the path that is executable out of the original structure in the RAT. In the RAT, as illustrated in Table 4 hereinbelow, it is seen that there are two kinds of entries instead of one: one statement for the web server, another for the CGI for which access rights are defined. Table 4 illustrates a fragment of the RAT for Example 3.

TABLE 4

| Web Server | CGI | Rights |
|---|---|---|
| /HTTP | /PROGRAMS/$D/$P | Execution |
| /PROGRAMS/$D/$P | $E(2)/DATA/$P | Read, Write |

Here, the path /PROGRAMS/ABC is granted access, according to the statement $E(2)/DATA/$P.

The resource access table 166 entries, thus modified by meta symbols, as described hereinabove, define both the access to resources and the execution path through the directory. The resource access table 166, uniquely determined for the dedicated, single purpose system, is called by the request for access made by the application or process. Thus, the entries in the resource access table are, at the same time, both statements of the access rights and statements of the execution path. In some operations, for example, a meta symbol (identified by a $ followed by a character) inserted into a statement in the resource access table may provide for, referring to Table 3:

(1) association of user identity information with the application or process (user ID and a password, e.g.);
(2) substitution of one user or a group of users for another user;
(3) substitution of a part of one execution path for another one;
(4) specifying at what point in the directory path the access begins, or how far into the directory the access rights extend; and
(5) specifying an access path limited to a particular file name or keyed to the access of a particular file. The meta symbols enable modifications to the entries in the resource access table 166 with instructions that define, on the fly, the particular access rights available to a particular process. Thus, instead of just performing a string comparison of the access rights string (with a predetermined set of access rights) the string is read and interpreted, based on its content, as it proceeds on the execution path.

In summary, the process-based security as disclosed hereinabove is most efficiently applied to specific functions. The operating system 162 of the dedicated, single-purpose system 160 is bundled only with the specific applications 168 needed including the resource access tables 166 and the necessary code to implement the use of the meta symbols and the process-based security access. Only internal resources are affected. Requests for access to resources 172 are processed from within the particular process or application 168 before invoking the operating system 162 but before the request handler is invoked.

Although the illustrative embodiment has been described in detail, it should be understood that various changes, substitutions and alterations can be made therein without departing from the spirit and scope of the invention as defined by the appended claims.

What is claimed is:

1. A method of providing security to a resource of a computer, comprising:
   receiving a request from a process having a requesting process path to access the resource of the computer, wherein the requesting process path does not identify the resource;
   accessing data stored in a memory area in response to the received request, the data comprising a resource access table having an ordered list of entries specifying process paths using one or more meta symbols, and specifying access rights to resources available to requesting processes having matching paths;
   determining, based on the requesting process path and the resource access table, a level of access to the resource for the requesting process by searching the list of entries in order to find a first entry in the resource access table matching the requesting process path, wherein the determining comprises:
      evaluating a process path specified by an entry in the resource allocation table by using the one or more meta symbols, wherein the one or more meta symbols represent one or more of the following:
         substituting an identification of a user of the requesting process for one or more meta symbols in the evaluated path, ignoring one or more parts of the requesting process path when determining if the requesting process path matches the evaluated path, and specifying a directory, resource name, and/or filename extension in the evaluated path to which the requesting process path is to be matched; and
      determining if the requesting process path matches the evaluated process path; and
   providing, to the process, access rights to the resource specified by the matching first entry.

2. The method of claim 1, wherein the requesting process path is an execution path.

3. The method of claim 1, wherein a single resource access table is stored in the memory area for each process.

4. The method of claim 1, wherein evaluating the process path comprises:
   expanding the one or more meta symbols.

5. The method of claim 1, wherein the data stored in the memory area includes a plurality of resource access tables, each of the plurality of resource access tables corresponding to a particular process and specifying one or more dynamic paths associated with the particular process, each of the one or more dynamic paths corresponding to a particular resource that is accessible by the particular process.

6. The method of claim 5, wherein accessing the data stored in the memory area comprises:
   accessing a resource access table corresponding to the process that requests access to the resource.

7. The method of claim 6, wherein determining the level of access to the resource comprises:
   searching the accessed resource access table for a dynamic path that corresponds to the resource to which the process requests access.

8. The method of claim 1, wherein the resource of the computer is access to functionality provided by a second process executing on the computer.

9. The method of claim 1, further comprising:
   binding the specified access rights to the process at the time the process is initiated.

10. A system for providing security to a resource of a computer, comprising:
    a memory area for storing data, the data comprising a resource access table having an ordered list of entries specifying process paths using one or more meta symbols and specifying access rights to resources available to requesting processes having matching paths;
    an interface module for receiving a request from a process having a requesting process path to access the resource of the computer, wherein the requesting process path does not identify the resource;
    an assessment module for determining, based on the requesting process path and the resource access table, a level of access to the resource for the process by searching the list of entries in order to find a first entry matching the requesting process path, the assessment module adapted to evaluate a process path specified by an entry in the resource allocation table by using the one or more meta symbols, and to determine if the requesting process path matches the evaluated process path, wherein the one or more meta symbols represent one or more of the following:
       substituting an identification of a user of the requesting process for one or more meta symbols in the evaluated path, ignoring one or more parts of the requesting process path when determining if the requesting process path matches the evaluated path, and specifying a directory, resource name, and/or filename extension in the evaluated path to which the requesting process path is to be matched; and
    a security module for providing, to the process, access rights to the resource specified by the first matching entry.

11. The system of claim 10, wherein the first process path is an execution path.

12. The system of claim 10, wherein a single resource access table is stored in the memory area for each requesting process.

13. The system of claim 10, wherein the assessment module is adapted to evaluate the process path by expanding the one or more meta symbols.

14. The system of claim 10, wherein the data stored in the memory area includes a plurality of resource access tables, each of the plurality of resource access tables corresponding to a particular process and specifying one or more dynamic paths associated with the particular process, each of the one or more dynamic paths corresponding to a particular resource that is accessible by the particular process.

15. The system of claim 14, wherein the assessment module is adapted to:
    access a resource access table corresponding to the process that requests access to the resource; and
    search the accessed resource access table for a dynamic path that corresponds to the resource to which the process requests access.

16. The system of claim 10, wherein the resource of the computer is access to functionality provided by a second process executing on the computer.

17. The system of claim 10, wherein the security module is adapted to bind the specified access rights to the process at the time the process is initiated.

18. A computer program product having a computer-readable storage medium having embodied thereon program code for providing security to a resource of a computer, the program code comprising:

an interface module for receiving a request from a process having a requesting process path to access the resource of the computer, wherein the requesting process path does not identify the resource;

an assessment module for determining, based on the requesting process path and data stored in a memory area, a level of access to the resource for the process, the stored data comprising a resource access table having an ordered list of entries specifying process paths and specifying access rights to resources available to processes-having matching paths, the assessment module adapted to evaluate a process path specified by an entry in the resource allocation table by using one or more meta symbols, and to determine if the requesting process path matches the evaluated process path, wherein the one or more meta symbols represent one or more of the following:

substituting an identification of a user of the requesting process for one or more meta symbols in the evaluated path, ignoring one or more parts of the requesting process path when determining if the requesting process path matches the evaluated path, and specifying a directory, resource name, and/or filename extension in the evaluated path to which the requesting process path is to be matched; and a security module for providing, to the process, access rights to the resource specified by the matching first entry.

19. The computer program product of claim 18, wherein the requesting process path is an execution path.

20. The computer program product of claim 18, wherein a single resource access table is stored in the memory area for each process.

21. The computer program product of claim 18, wherein the assessment module is adapted to evaluate the process path by expanding the one or more meta symbols.

22. The computer program product of claim 18, wherein the data stored in the memory area includes a plurality of resource access tables, each of the plurality of resource access tables corresponding to a particular process and specifying one or more dynamic paths associated with the particular process, each of the one or more dynamic paths corresponding to a particular resource that is accessible by the particular process.

23. The computer program product of claim 22, wherein the assessment module is adapted to:

access a resource access table corresponding to the process that requests access to the resource; and search the accessed resource access table for a dynamic path that corresponds to the resource to which the process requests access.

24. The computer program product of claim 18, wherein the resource of the computer is access to functionality provided by a second process executing on the computer.

25. The computer program product of claim 18, wherein the security module is adapted to bind the specified access rights to the process at the time the process is initiated.

\* \* \* \* \*